No. 661,620.  
V. E. RUMBARGER.  
TUBE EXPANDER.  
(Application filed Jan. 19, 1900.)

Patented Nov. 13, 1900.

(No Model.)

WITNESSES  
K. E. Koehne.  
L. E. Puffer.

INVENTOR  
Victor E. Rumbarger  
BY Wm. C. Koehne  
HIS ATTORNEY.

UNITED STATES PATENT OFFICE.

VICTOR E. RUMBARGER, OF DAYTON, OHIO.

TUBE-EXPANDER.

SPECIFICATION forming part of Letters Patent No. 661,620, dated November 13, 1900.

Original application filed October 30, 1899, Serial No. 735,312. Divided and this application filed January 19, 1900. Serial No. 1,999. (No model.)

*To all whom it may concern:*

Be it known that I, VICTOR E. RUMBARGER, a citizen of the United States of America, residing and having my post-office address at Dayton, in the county of Montgomery and State of Ohio, have invented a certain new and useful Improvement in Tube-Expanders; and I hereby declare that the following is a clear, full, and exact description thereof, reference being had to the accompanying drawings, in which like numerals refer to like parts.

My invention relates to a new and useful improvement in tube-expanders; and it consists of the details of construction and combinations of the various parts, all as hereinafter described, and more particularly designated in the claims.

Figure 1:
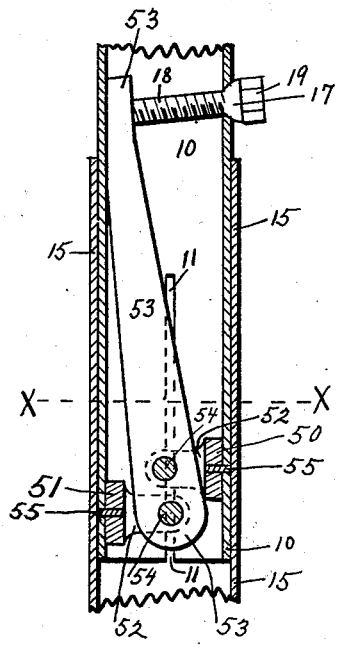
Figure 2:
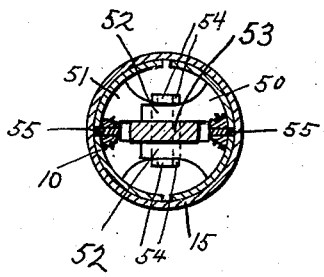

In the drawings, Figure 1 illustrates a central vertical sectional view upon line X X of Fig. 2. Fig. 2 is a sectional plan view on line X X of Fig. 1.

In said drawings are illustrated the adjacent ends of telescoping tubular parts 10 and 15, the tube 10 telescoping within the tube 15, and said tube 10 being provided with one or more slots 11, extending from its telescoping end. Extending longitudinally within said tubes is a lever 53, provided near its lower end with two bearing openings or pins 54, extending at substantially right angles to the length of said lever and being at different points in the length of said lever. Pivotally connected to said pins 54 are the inner ends of members 50 and 51, whose outward ends or faces are adapted to bear against opposing portions of said tubular parts to cause said parts to bind on each other by the oscillation of said lever 53 about its axis, which is transverse to the axis of said tubular parts and which axis coincides with the axis of one or the other of said bearing-pins 54, accordingly as one or the other of said members 50 and 51 first contact with the bore of tube 10. Each of said members 50 and 51 is provided in the instance shown with a pair of ears 52, extending on opposite sides of the lower end of said lever 53, which ears 52 form the inner ends of said members 50 and 51, which are pivotally connected to said lever 53 by said pins 54. Projections 55 extend from the bore of said tube 10 and coöperate with said members 50 and 51 to form a guide therefor to maintain the contacting faces of said members 50 and 51 substantially parallel with the wall of said tube 10 and to cause said members 50 and 51 to be moved at substantially right angles to said tube 10 by the oscillation of said lever 53. In the instance shown in the drawings said projections 55 fit into openings in said members 50 and 51, engaging opposing portions of said tube 10 within the length of said slot 11, and in the instance shown said members engage the lower end of said tube 10. The end of said lever 53 provided with said bearings 54 is here for convenience termed the "lower" end of said lever, while the opposite end thereof is termed the "upper" end. The upper end of said lever 53 is relatively thinner than the lower end to permit the oscillation of said lever 53 within the bore of said tube 10. Through said upper end of said lever 53 is formed a screw-threaded opening at substantially right angles to said bearings 54 and to receive the screw 18, passing through an opening in the end of said tube 10, projecting from said outer tube 15, said opening being at an angle to the bore of said tube 10 and being of different diameters to fit the portion 17 of said screw 18 of correspondingly different diameters, so that when said screw 18 is revolved to oscillate said lever 53 said differing diameters of said opening and said portion 17 permit said screw 18 to accommodate itself to the different angles to which said lever 53 may be oscillated or moved, while the head or operating member 19 upon the end of said screw 18, projecting without said tube 10, permits the operation of said screw 18, and the consequent operation of said lever 53, from a point without said tube 10.

In another pending application for "Means for expanding the tubes of bicycle parts and securing same," filed by me in the United States Patent Office on October 30, 1899, Serial No. 735,312, of which application this is a division, I have claimed subject-matter which prevents me from claiming the above-described details of construction, and this divisional application is filed for the purpose of claiming the same.

Having now so fully described my invention that those skilled in the art may freely make and use the same when this exclusive grant shall cease to operate, what I claim, and pray to secure by Letters Patent, is—

1. The combination of two telescoping tubular parts, a clamping-lever extending longitudinally within said parts, separate members upon opposite sides of and actuated by said lever, said members engaging opposing portions of the inner tubular parts, one of said members being pivotally connected to said lever, the axis of said pivoted connection being at substantially right angles to the bore of said tube, and means for oscillating said lever to effect or release the binding action of said members, substantially as specified.

2. The combination of two telescoping tubular parts, a clamping-lever extending longitudinally within said parts, separate members pivotally connected at different points in the length of said lever and engaging opposing portions of the inner tubular part the axis of each of said pivotal connections being at substantially right angles to the axis of said parts, and means for oscillating said lever upon an axis substantially coinciding with one of said pivotal connections, substantially as specified.

3. The combination of a tube, a plurality of separate members within said tube and bearing against different portions thereof, and means extending longitudinally within and movable at an angle to the bore of said tube and connected to and moving said members at right angles to the length of said tube, for effecting and releasing the binding action between said members and tube, substantially as specified.

4. The combination of a tube, a slot in said tube, a clamping-lever extending longitudinally within said tube, a separate bearing member pivotally connected to said lever, the axis of said pivotal connection being at substantially right angles to the length of said lever, a coöperating guide and guideway between said member and said tube at a point within the slotted portion of said tube, and means for moving said lever about an axis substantially coinciding with the axis of said pivotal connection, substantially as specified.

In witness whereof I have hereunto set my hand this 13th day of January, 1900.

VICTOR E. RUMBARGER.

Witnesses:
LEVI D. HELLER,
IRA C. KOEHNE.